Figure 1:
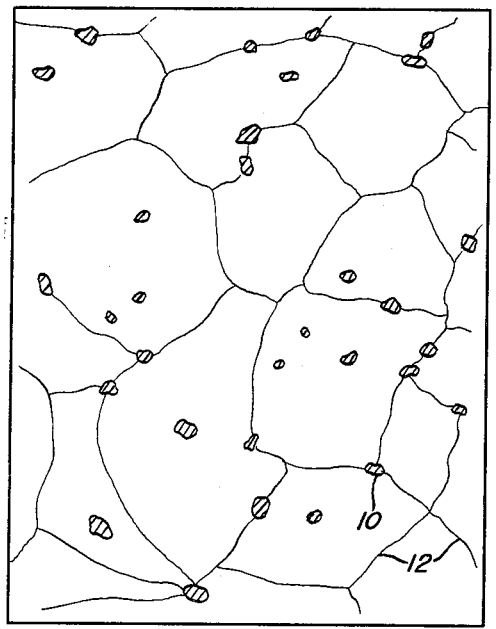

April 3, 1962 G. F. TISINAI ET AL 3,028,268
METHOD FOR STABILIZING Ni-Cr-Mo WELDED ALLOY
Filed Jan. 19, 1960

INVENTORS:
George F. Tisinai
Edwin S. Troscinski
BY
ATTORNEY 3,028,268
METHOD FOR STABILIZING Ni-Cr-Mo WELDED ALLOY
George F. Tisinai, Highland, Ind., and Edwin S. Troscinski, Chicago, Ill., assignors to Standard Oil Company, Chicago, Ill., a corporation of Indiana
Filed Jan. 19, 1960, Ser. No. 3,378
3 Claims. (Cl. 148—13)

This invention relates to improvements in and relating to nickel-chromium-molybdenum alloys and apparatus fabricated therefrom.

More particularly this invention relates to a process for imparting resistance to corrosion to nickel-chromium-molybdenum alloys and especially to welds of nickel-chromium-molybdenum alloys and the heat-affected portions of the base metal adjacent to the welds, to the fabrication of chemical apparatus from nickel-chromium-molybdenum alloys involving welding of plates, sheets, segments, sections, shaped pieces, cast forms and the like and to the use of said apparatus in chemical processes providing acidic liquids and/or vapors.

The term "weld" as employed in the specification and claims is used to designate a metallic joint between two portions of base metal where the metal in said joint is substantially of the same composition as the base metal.

Nickel-chromium-molybdenum alloys containing 54 to 56% Ni, 14.5 to 16.5% Cr, 15 to 17% Mo, 4 to 7% Fe and 3 to 4.5% W with a maximum of 0.15% carbon are exceptionally resistant to corrosion when subjected to an annealing process known as solution heat treating; i.e., heating the alloy uniformly to a temperature just below, about 100° F. below, the melting point of the alloy, generally in the range of 2210 to 2260° F., followed by rapid cooling, in 120 seconds or less, in air or water. The time held at 2210 to 2260° F. varies with the thickness of the alloy; e.g., 5 minutes for 0.005 to 0.025 inch up to 2 hours for two inches, with one hour per inch thickness being a general practice for soaking. However, when chemical apparatus is fabricated from such annealed nickel-chromium-molybdenum alloy by welding strips, sheets, segments, sectors, shaped pieces or the like, the grain structure in the alloy when not properly solution heat treated (annealed) even to a greater extent in the metal adjacent to the weld heated during the welding process and to some extent in the weld takes a form which is susceptible to accelerated intergranular type of corrosion attack, especially acidic oxidative corrosion. This type of corrosion results from the attack on a relatively continuous envelope of grain boundary precipitate, said precipitate being mainly an intermetallic compound (hereinafter defined) as well as perhaps some carbide precipitate. The formation of such substantially continuous envelope of grain boundary precipitate is accentuated in any region of the alloy heated during welding. Such a region or regions include portions of base metal adjacent to the weld or welds heated during welding (and may include the weld or welds) and are hereinafter referred to in the specification and claims as "heat-sensitized area."

Small pieces of apparatus such as small reactors open at one end, short lengths of pipe, valves, elbows, T's, etc., especially if thin walled can be subjected to the solution heat treatment after fabrication. However, thick walled and especially large pieces of apparatus and complex apparatus such as reactors; distillation, fractionation, extraction columns which are several feet in diameter and ten to twenty or thirty feet long or longer having internal bafflers, plates, heat exchangers and the like cannot in a practical manner be quickly quenched within the time required, less than 120 seconds, to avoid grain boundary precipitation effects. Neither can multi-tube apparatus such as condensers, heat exchangers, long conduits, thick walled apparatus such as used with super-atmospheric pressure or with low sub-atmospheric pressures be subjected to the hereinbefore described quick quenching. There has been provided no satisfactory, practical process for treating a heat-sensitized area of the Ni-Cr-Mo alloys of the composition hereinbefore noted other than annealing. Since annealing is impracticable because it must be followed by extremely quick cooling for treating heat-sensitized areas in many fabricated apparatus, there is a need for a process which will reduce the susceptibility of attack, especially by acidic oxidative materials, of the heat-sensitized areas of said nickel-chromium-molybdenum alloys.

It has been reported in U.S. Patent 2,237,872 that the susceptibility toward corrosion with respect to nickel-base alloys containing molybdenum may be overcome by heat treatment of these alloys at temperatures as high as 2150° F. for 2 to 4 hours. However, our experience with a certain Ni-Cr-Mo alloy of this class hereinafter defined is that only an insignificant and inconsistent number of heats or production lots of this specific alloy might be benefited by this suggested treatment. We have found no way to predict which heats will or will not be benefited by this previously suggested heat treatment process. Also in our experience with this specific Ni-Cr-Mo alloy hereinbefore defined we have observed that the upper temperatures disclosed in the above-cited patent as being preferred, about 1900 to 1950° F., greatly enhance the unfavorable formation of a substantially continuous precipitate of an intermetallic compound which is exceedingly susceptible to corrosive attack by acidic materials, especially acidic oxidative materials.

This invention provides a completely dependable thermal stabilization process for improving the resistance to acidic oxidative corrosion of all heats of nickel-chromium-molybdenum alloys containing 54 to 56% Ni, 14.5 to 16.5% Cr, 15 to 17% Mo, 4 to 7% Fe and 3 to 4.5% W and a small amount of Si; i.e., up to 1% maximum. It also provides a process whereby apparatus useful in chemical processes involving acidic oxidative materials can be treated by a practical thermal stabilization to improve with certainty the resistance to acidic corrosion of said nickel-chromium-molybdenum alloys. In addition, this invention provides a method of thermal stabilization of even heat-sensitized areas of said Ni-Cr-Mo alloys containing 54 to 56% Ni; 14.5 to 16.5% Cr; 15 to 17% Mo; 4 to 7% Fe; 3 to 4.5% W; up to 2.5% Co; and 0.04 to 0.15% C associated with some Si (up to 1% maximum) to reduce the susceptibility of attack by acidic oxidative materials, especially intergranular corrosion. This invention further provides a practical method for heat treating chemical apparatus fabricated from Ni-Cr-Mo alloys, hereinbefore designated, to permit the treated apparatus to be used in connection with highly acidic oxidative chemical reactions for periods of time acceptable for industrial practices. Other advantages will become apparent from the description of the invention and the uses thereof.

It has been found that all heats of solid nickel-chromium-molybdenum alloys, specifically Ni-Cr-Mo alloys containing 54 to 56% Ni; 14.5 to 16.5% Cr; 15 to 17% Mo; 4 to 7% Fe; 3 to 4% W; up to 2.5% Co; and 0.04 to 0.15% C with some Si, in which grain boundary precipitates form containing an intermetallic compound subject to intergranular corrosive attack by acidic oxidative materials, can be thermally treated with consistently dependable results to greatly reduce the susceptibility of attack by acidic oxidative materials. This heat treatment comprises heating said solid alloy, especially after fabrication including welding, at certain elevated temperatures above about 2000° F. for a sufficient length of time to dissolve, agglomerate and separate the grain boundary precipitate which had formed as a substantially continuous grain boundary envelope. Such a continuous precipitate will always form while the alloy, hereinbefore defined, is heated from ambient temperatures to at least 2000° to 2100° F. and will remain as a substantially continuous grain boundary precipitate unless some other steps are taken to provide dissolving and agglomerating of the intermetallic compound precipitate. The heat treating process of this invention provides the necessary, additional steps.

The heat treatment employed in the process of this invention should include holding the solid alloy at heat stabilization temperatures which are in the range of 2000° to 2100° F., preferably in the range of 2025° to 2075° F. For it is within this temperature range that agglomeration and separation of the intermetallic precipitate in the grain boundary takes place. Holding at temperatures below 2000° F., 2000 to 1600° F., will enhance the formation of a continuous grain boundary precipitate of intermetallic compounds as a complete envelope. For example, samples of a solution heat treated alloy of the composition hereinbefore set forth when held at 1975° F. for 1 to 96 hours caused the formation of a complete envelope in a form of very close particles of intermetallic precipitate. Some of these precipitate forms were so continuous that no individual particles were ascertainable. After the alloy is held at the stabilization temperature of the process of this invention, the heating is discontinued, and the solid alloy is cooled to a black heat temperature, no slower than by forced air cooling.

The above procedure will accomplish the desired agglomeration and separation of the grain boundary precipitate so that the particles of intermetallic precipitate are discrete and discontinuous, thereby providing a uniform crystalline structure highly resistant to intergranular corrosive attack by acidic oxidative materials. For cooling, the use of forced air or water is preferred. The thermal stabilization process of this invention can be employed to thermally treat the hereinbefore defined Ni-Cr-Mo alloys regardless of the degree of efficiency of the prior solution annealing to which the solid alloy had been subjected. It has been found that sheets, plates, billets, etc. of the Ni-Cr-Mo alloys of the composition hereinbefore defined are not all uniformly solution annealed by the manufacturer of said sheets, plates, billets, etc. for there is a great variance from "heat" to "heat"; i.e., different lots of the alloy annealed (solution heat treated) at different times by the same procedure. The reason for this wide variance perhaps is a result of cooling slower than 120 seconds, or a result of silicon impurities or a combination of the two. However, whether or not the solution anneal process has been excellent, good or very poor is now of little importance since, as hereinbefore pointed out, it is the heating of the alloy above ambient temperature to 2000 to 2100° F. and what is done thereafter that is of the utmost importance.

The intermetallic compound precipitate in the particular Ni-Cr-Mo alloy hereinbefore defined has been found by X-ray diffraction analysis of fillings and analysis of extracts of electrolytically dissolved samples of the alloys to be isomorphous with intermetallic compounds $Fe_7Mo_6$, $Fe_7W_6$, $Co_7Mo_6$, $Co_7W_6$ and some nickel and is always associated with a small amount of Si. From these studies and other analysis the intermetallic comound has the general formula of a "7-6 compound" such as $(M)_7(M_1)_6$ associated with silicon, where M is a mixture of Ni, Fe and Co, and $M_1$ is a mixture of Mo and W. More specifically, without the proportions of each metal in each mixture, the intermetallic compound is $(Ni, Fe, Co)_7$ $(Mo, W)_6 + 3$ to $4\%$ Si. The amount of this intermetallic compound which can or may form is dependent upon unknown factors of chemical composition, possibly associated with the presence of Si. The amount of intermetallic compound which can form will vary from insignificant amounts to substantially amounts. Thus, in only a minority of the heats where the presence of intermetallic compound is insignificantly small, the heat stabilization treatment of 2 to 4 hours suggested in U.S. Patent 2,237,872 for the upper temperatures disclosed therein may but need not satisfactorily produce a corrosion-resistant product. The majority of the heat lots will not respond favorably to the heat treatment suggested in this patent, but rather require that the alloy be held for 6 to 24 hours at 2000 to 2100° F. if direct heating to the stabilization temperature is only employed. In addition, there is a significant number of heat lots encountered which are much more difficult to heat stabilize to the desired crystalline structure, and these heat lots require the heating to an elevated temperature in the range of 2100 to 2200° F. followed by holding at a temperature in the range of 2000° to 2100° F. and then cooling to black heat according to the preferred embodiment of the process of this invention. The preferred embodiment of the process of this invention will produce consistent, dependable results for all heats of the specified alloy and will always result in the desired agglomerated form of the intermetallic compound.

All of the herein specified Ni-Cr-Mo alloys, regardless of the previous history of solution anneal, require the thermal stabilization of the process of this invention. One cannot predict by metallographic inspection of the alloy as received whether it will respond satisfactorily to the prior art heat treatment conditions outside the preferred range thereof without carrying out a trial and error type of combination of heat treatment temperatures and times of holding at these prior art temperatures of the various heats of alloy prior to fabrication. Also, in most cases sheets or plates from various heat lots are available in the stock of the apparatus fabricator and little use could be made of the metallographic examination other than to know that sheets or plates from the various heats were being or had been combined in the fabrication of the apparatus.

Although it has been found that some annealed solid Ni-Cr-Mo alloys can be heat stabilized in the heat-sensitized areas by direct heating of the solid alloy containing the heat-sensitized areas to a heat stabilization temperature in the range of from 2000 to 2100° F. for more than 4 hours, more specifically at least 6 hours and preferably in the range of 6 to 24 hours with 6 to 8 hours, in general, being satisfactory at temperatures of 2025 to 2075° F.; it has also been discovered that an even better grain boundary precipitate structure can be accomplished in any case by including a period of slow heating (e.g., 3 to 5 hours) to an elevated temperature above said temperatures of heat stabilization. The slow heating time is determined from the time to heat from below about 1300° F. to an elevated temperature in the range of 2100 to 2200° F. The alloy is then held at the lower heat stabilizing temperatures of 2000 to 2100° F. By employing the slow heat up to the higher temperature, the time of holding at the first stabilization temperature can be reduced substantially but must not be reduced below about 2 hours. By the combination of slow heat up to the temperatures above heat stabilization temperatures and then holding at the heat stabilization temperatures, the total heat treament time may be reduced over that required for heating directly to and holding at heat stabilization temperatures and yet superior results are always obtained.

Thus, for the best results without investigating each heat lot the solution annealed solid Ni-Cr-Mo alloys containing heat-sensitized areas are thermally treated by the process of this invention. The specified alloys with which this invention is concerned are heated to an elevated temperature, preferably slowly in the range of about 3 to 5 hours, to a temperature above 2100° F., desirably in the range of 2100 to 2200° F., preferably in the range of 2125 to 2175° F., kept at such elevated temperature in the range of 30 to 100 minutes, cooled to the stabilization temperature of 2000 to 2100° F. and there maintained for a minimum of 2 hours. Thereafter the solid Ni-Cr-Mo alloy is further cooled to black heat at a rate equivalent to cooling with forced air, preferably with forced air. This process gives excellent corrosion resistance to the heat stabilized solid Ni-Cr-Mo alloys either when they are from the poorer solution annealed solid alloy source or, in fact, even from the better solution annealed solid alloy sources. The alloys so treated are better heat stabilized and have greater corrosion resistance when thermally treated by the latter process than when treated by any previously suggested process. It is fundamental to the direct heat embodiment of the process of this invention that the thermal treatment includes maintaining the heated solid alloy at a stabilizing elevated temperature in the range of 2000 to 2100° F. for a period of time, more than four hours, but for the preferred embodiment of this invention holding at the heat stabilization temperature can be a much shorter time as hereinbefore disclosed. The thermal treatment according to the process of this invention results in the agglomeration and separation of discrete particles of the intermetallic compound precipitated in the grain boundary.

Among the preferred Ni-Cr-Mo alloys having alloy metal components in the proportions hereinbefore designated are included an alloy of Haynes Stellite Company known as "Hastelloy" C and a Lang alloy 5R. The preferred Ni-Cr-Mo alloy is not liimted to these particular alloys, for the thermal treating process of this invention is useful with other similar alloys available from other sources having the composition hereinbefore specified. Apparatus fabricated from any of the alloys coming within the defined composition of the preferred alloy when heat treated according to the process of this invention will have the uniform crystalline structure imparting the improved corrosion resistance.

The thermal stabilization process of this invention can be readily employed to provide fabricated corrosion-resistant apparatus of any size and is a highly practical method for heat treating large and complex apparatus fabricated from Ni-Cr-Mo alloys, but not limited to, such apparatus as reactors; distillation columns; condensers; vapor and liquid transfer conduits; catalyst chambers; storage tanks; crystallization tanks; pumps; compressors; heat exchangers; separating devices such as decanters, filters and centrifuges; and stirring devices and their drive shafts. The thermal stabilization process of this invention can be used to reduce the susceptibility to intergranular corrosive attack on thin liners, solid and clad types of construction.

The heat treatment of the Ni-Cr-Mo alloys hereinbefore defined may be important. The rolled sheets, strips, plates, etc. and cast forms of the alloy can be either annealed (solution annealed) or heat stabilized according to the thermal process of this invention prior to welding, since both processes will impart to the base metal grain structures desirable for good corrosion resistance. For some uses in chemical processes post fabrication weld heat stabilization by the thermal process of this invention will not be required for good corrosion resistance as long as the alloy has been thermally treated according to the process of this invention, in addition to solution annealing, and even post fabrication repair welding can be done without additional thermal treatment of the heat-sensitized areas. However, to obtain the maximum benefits of the thermal stabilization process of this invention post weld heat-stabilizing according to the process of this invention is required, especially when the alloy is to be subjected to acidic oxidative corrosive materials. Thus, with a post weld heat-stabilization, plates, sheets, strips, cast forms, shaped pieces, segments, sectors, etc. of Ni-Cr-Mo alloy either annealed or heat stabilized according to the process of this invention can be welded to form the desired apparatus.

One of the end results accomplished by the heat-stabilization process of this invention can be illustrated by comparing the calculated life of two 0.25 inch oxidation reactor liners fabricated by welding strips of Hastelloy C which had been heat-stabilized at 2050° F. for 6 hours according to the process of this invention prior to welding. One liner was not post weld heat treated and is designated "as fabricated." The other was post weld heat-stabilized at 2050° F. for 6 hours according to the process of this invention. The calculated life in this comparison is based on the measured attack on the same alloy with the same prior weld heat history occurring over a period of 1606 hours by liquids in the liquid phase air oxidation at 380–425° F. and 300–400 p.s.i.g. of xylene in the presence of acetic acid, bromine and a heavy metal oxidation catalyst, the bromine having been provided by adding tetrabromoethane. The areas of attack are designated "base metal"; i.e., not affected by the heat of welding; "heat-affected zone"; i.e., the base metal adjacent to the weld; and "weld." The comparative results are shown in Table I.

TABLE I

| Area Attacked | Calculated Life—Years | |
| --- | --- | --- |
| | As Fabricated | Fabricated, Heated to 2,050° F. for 6 hours, Water Cooled |
| Base Metal | 36 | 36 |
| Heat-Affected Zone | 8 | 18 |
| Weld | 9 | 15.5 |

A test portion of a tube in a condenser joined to the remaining portion of the condenser tube by welds and being in the inlet or hot end of the condenser receiving hot vapors from a reaction vessel used in the above described process, was fabricated from Hastelloy C annealed (solution heat treated) prior to welding and received no post weld heat treatment. After more than 980 hours of use the test portion of the condenser tube was removed and extent of corrosion in the base metal and heat-affected zone was determined by metallographic measurements. The observed corrosion linearly extrapolated to an inch per year rate showed the penetration in the heat-affected zone to be 0.156 inch per year and in the base metal to be 0.018 inch per year. The life of such a condenser tube having a wall thickness of 0.25 inch would be about 1.6 years. Thus, when an 0.25 inch reactor liner is fabricated from the annealed (solution heat treated) Ni-Cr-Mo alloy and not post weld treated, the corrosion attack in the reactor would be greater than in the condenser and would be "catastrophic," for complete penetration of the heat-sensitized zones would occur in too short a time for industrial application.

Another advantage of post weld thermal stabilization according to the process of this invention is the substantial increase in the corrosion resistance of the heat-sensitized areas. Other advantages are apparent from other comparisons. Solution heat treating with quick quenching after welding of Hastelloy C often results in cracks. Subsequent sealing of the cracks by welding results in heat-sensitized areas. Solution heat treating with quick quench is not feasible for thick wall fabrication because of difficulty of quenching fast enough throughout a thick wall to prevent primary grain boundary precipitation of compounds, including carbides and especially corrosion susceptible intermetallic compound. However, the thermal treatment process of this invention, including the heat stabilization step at 2000 to 2100° F. and air draft cooling to a black heat temperature, has little tendency to cause cracking and thus requires no further weld sealing. Water cooling might cause cracking of thick sections. Even if cracks do appear, weld sealing does not cause further significant adverse grain boundary precipitation.

As hereinbefore indicated, the intergranular attack by oxidative acidic materials takes place by attacking an intermetallic compound precipitated in the grain boundary. When the intermetallic compound is precipitatd as discrete agglomerates without substantial continuity in the grain boundary; i.e., the discrete agglomerates are so positioned in the grain boundary as to have base alloy separating them, the corrosive attack of a discrete agglomerate of the intermetallic compound at the surface ceases when that agglomerate has been dissolved out by the oxidative acidic material. Penetration down through the grain boundary of the alloy is stopped by the base alloy metal and penetration along the grain boundary of the surface of the metal is also stopped. Whereas, when the precipitate of intermetallic compound is in the form of a continuous grain boundary envelope or even substantially continuous; i.e., the precipitate particles are not actually touching but have very little base alloy metal separating them, the acidic corrosive attack is continuous along the surface of and down through the alloy. These relationships of the intermetallic precipitate are illustrated in various figures in the accompanying drawing which are presented to illustrate the grain structure of the Ni-Cr-Mo alloy of the particular composition hereinbefore set forth.

In the accompanying drawing FIG. 1 exemplifies the grain structure of the particular Ni-Cr-Mo alloy hereinbefore defined as would be observed from a typical photomicrograph (500× magnification) of an etched sample of the alloy annealed or solution heat treated. This represents the poorest crystalline structure as is evidenced by the continuous envelope grain boundary precipitate of intermetallic compound designated by reference numeral 12. The particles designated by reference numeral 10 are metallic carbides, $M_6C$, wherein M is a mixture of metals.

Figure 2:
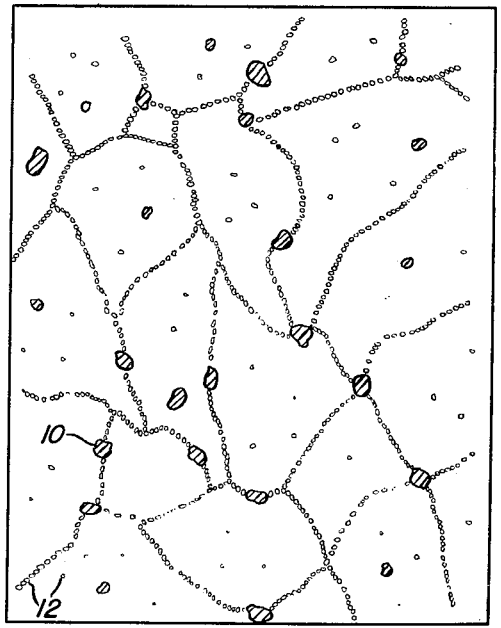

FIG. 2 is also a representation of a typical photomicrograph (500× magnification) of an etched sample of the particular Ni-Cr-Mo alloy hereinbefore defined and exemplifies the grain structure containing substantially continuous particles of precipitate in the grain boundary and, although possessing somewhat better separation than that of FIG. 1, still does not possess an acceptable separation of grain boundary precipitate particles because of the substantially connected chain relationship of intermetallic compound precipitate 12 and would be substantially equivalent in susceptibility to oxidative-acidic corrosion attack at the grain boundary.

Figure 3:
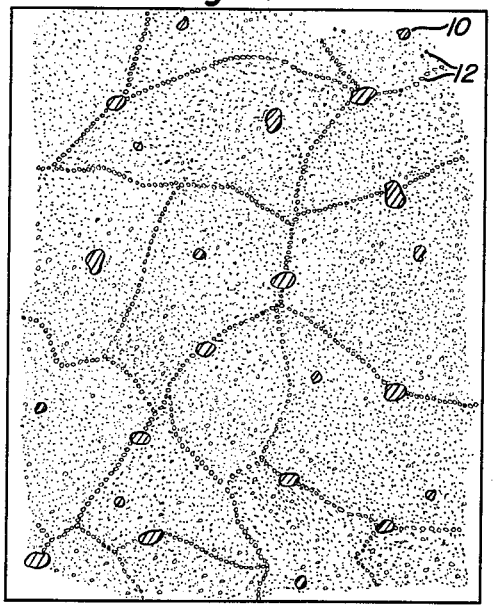

FIG. 3, a representation of a typical photomicrograph (500× magnification) of an etched sample of the particular Ni-Cr-Mo alloy hereinbefore defined, exemplifies the grain structure containing discrete intermetallic compound precipitate particles 12 uniformly separated to give improved corrosion resistance. However, this structure, especially with respect to the grain boundary, is about marginal, the lower limit, with respect to the corrosion resistance with which this invention is concerned. It is the result of slowly heating the poorest solution heat treated (annealed) alloy to the stabilization temperature hereinbefore defined and holding at this temperature for more than four hours.

Figure 4:
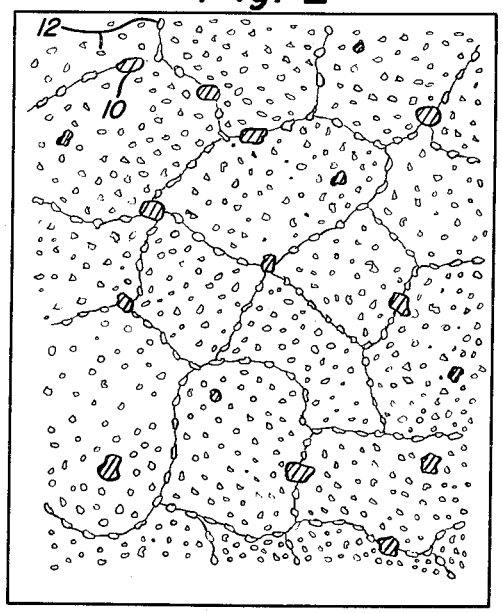

FIG. 4, a representation of a typical photomicrograph (500× magnification) of an etched sample of the particular Ni-Cr-Mo alloy hereinbefore defined, exemplifies the grain structure containing an optimum type of separated discrete particles of intermetallic compound precipitate particles 12 not only uniformly separated but also sufficiently agglomerated to impart the best corrosion resistance with which this invention is concerned. Such a grain structure can always be obtained from any heat lot of the particular Ni-Cr-Mo alloy hereinbefore defined providing the slow heating to a temperature above the stabilization temperature plus holding at the stabilization temprature is accomplished according to the preferred emodiment of the process of this invention.

In each of the four figures of the accompanying drawing reference numeral 10 identifies the carbide precipitate and reference numeral 12 identifies the intermetallic compound precipitate.

The minimum heating period of more than 4 hours, preferably 6 hours or more, according to the direct heat process of this invention has been established as critical when only the heat stabilization step at 2000 to 2100° F. is employed. It has been found that for the majority of the heats of the specified alloy heating to 2025° to 2075° F. for less than 4 hours and then cooling to black heat temperature did not eliminate the continuous or substantially continuous nature of the intermetallic precipitate at the grain boundary. Heating to 2025° to 2075° F. for 4 hours and cooling to a black heat temperature disrupted the grain boundary precipitate from a continuous boundary film to agglomerates but did not sufficiently separate agglomerates for the agglomerates were in substantial contact as in FIG. 2. Six hours of heating at 2025° to 2075° F. followed by cooling to a black heat temperature resulted in the acceptable separation of the grain boundary agglomerates to provide improved corrosion resistance as typified by the separation shown in FIG. 3. Heating for more than 6 hours and as long as 24 hours at 2025° to 2075° F. followed by cooling to a black heat temperature further isolated the discrete grain boundary agglomerates to a structure intermediate to that shown in FIG. 3 and FIG. 4. Heating for more than 24 hours at 2025° to 2075° F. followed by cooling to a black heat temperature produces such a slight change in isolation of grain boundary agglomerates as to provide little further advantage. As a practical application of the process of this invention the heating at 2000° to 2100° F. and preferably at 2025° to 2075° F. should be for more than 4 hours, preferably at least 6 hours, and desirably from 6 up to about 24 hours.

As indicated above, some additional heating beyond the 6 hours at heat stabilizing temperatures causes further isolation of the grain boundary precipitate. Rather than employing these longer times at the heat stabilizing temperatures, 6 or more hours, the same or even better end result, good agglomeration, isolation and separation of the intermetallic compounds in the grain boundary precipitate can be achieved by slowly heating the particular Ni-Cr-Mo alloy of a composition hereinbefore defined, preferably after welding, to a temperature above the heat stabilization temperature but below the solution annealing temperature; i.e., in the range of 2100° to 2200° F. and preferably in the range of 2125° to 2175° F., for a short time, 5 to 100 minutes. The heated welded solid alloy is then maintained at the heat stabilization temperature for 80 to 200 minutes and thereafter further cooled to black heat as before. The resulting crystalline structure will be that of FIG. 4.

The fabricated apparatus thermally stabilized according to the methods of this invention may be employed in such chemical processes providing corrosive liquids and/or vapors such as are present in the dehydration of acetic acid to acetic anhydride, and concentration of acetic acid, and preparation of glacial acetic acid especially in the presence of a halide such as a bromide and/or chloride ion; distillation and other separations and recovery of glacial acetic acid especially from aqueous acetic acids containing formic acid and bromide and/or chloride ions; fatty acid distillations and separations especially when chloride or bromide ions are present; nitric acid oxidations with dilute nitric acid; HCl scrubbing; but may be employed to great advantage in chemical processes where acidic oxidative corrosion would be encountered, such as in oxidative chlorination; e.g., by reacting HCl, $O_2$ and benzene; and especially in catalytic liquid phase oxidations of aromatic compounds with molecular oxygen in the presence of acids of the acetic acid series as the reaction medium, especially acetic acid, with or without bromine promoted heavy metal oxidation catalysts; recovery and separation of aromatic acids so produced; and the recovery of the aliphatic acids of the acetic acid series when so used as reaction medium; among other acidic oxidative corrosive processes. The apparatus thermally stabilized according to the process of this invention is especially useful in the process for preparing heterocyclic and aromatic di-, tri-, tetra- and other polycarboxylic acids by the liquid phase oxidation with molecular oxygen of substituted heterocyclics and aromatics whose nuclear side chain substituents are oxidizable to COOH groups in the presence of a catalyst comprising in conjoint presence bromine and a heavy metal oxidation catalyst such as more specifically disclosed in U.S. Patents No. 2,833,816 and No. 2,833,778 and especially when such oxidations are carried out in the presence of acetic acid or other members of the acetic acid series as the reaction medium; i.e., saturated aliphatic monocarboxylic acids containing 2 to 6 carbon atoms. The oxidation reaction mixtures of the processes of said patents are highly corrosive, severely attacking various stainless steels among other metals commonly used in the manufacture of chemical apparatus. The Ni-Cr-Mo alloys, hereinbefore more specifically defined, are markedly superior to stainless steels and are acceptable for use in such oxidation processes producing acidic oxidative conditions when properly heat treated according to the process of this invention. The Ni-Cr-Mo Hastelloy C alloy and other similar alloys are outstanding for the fabrication of all apparatus used in these oxidations wherein aromatic and heterocyclic carboxylic acids are produced providing the heat-sensitized areas are treated in accordance with the present invention for the intermetallic precipitate is adequately formed as separated discrete agglomerates. For example, the reactors; vapor, liquid and slurry transfer conduits; crystallization tanks; filters; centrifuges; distillation equipment including condensers, columns and reboilers; vapor scrubbers; dryers; acetic acid recovery apparatus and the like, when fabricated from such Ni-Cr-Mo alloys and heat-stabilized according to the present invention have in the alloy crystalline structures containing separated discrete agglomerates of the

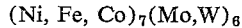

intermetallic compound to be suitably resistant to the acidic oxidative corrosion so as to be useful in an industrial installation.

To illustrate the effectiveness of the thermal treatment of the process of this invention, strips of Ni-Cr-Mo Hastelloy C alloy containing 54 to 56% Ni; 14.5 to 16.5% Cr; 15 to 17% Mo; 4 to 7% Fe; 3 to 4.5% W; up to 2.5% Co; and 0.04 to 0.15% C and containing welds were exposed to acidic vapors and liquids in a reaction vessel wherein xylene was oxidized with molecular oxygen in the presence of a catalyst comprising in conjoint presence a source of bromine and a heavy metal oxidation catalyst using acetic acid as the reaction medium. The details of these exposure tests are given in the following description.

*Example I*

In a suitable reaction vessel containing mixed xylenes, acetic acid, a source of bromine and a heavy metal oxidation catalyst in the proportions of 1 part by weight mixed xylenes, 2 parts by weight acetic acid, 0.25 part by weight tetrabromoethane as a source of bromine, and 0.7 part by weight of a heavy metal oxidation catalyst comprising a mixture of cobalt and manganese acetates, air was passed into the reaction mixture at a rate of 70–120 standard cubic feet of air per pound of hydrocarbons while the reaction mixture was at a temperature of from 380 to 425° F. and a pressure of 300 to 400 p.s.i.g., vapors from the reaction vessel were withdrawn to condense the acetic acid and water therefrom, the condensate was returned to the reaction vessel and the uncondensed gases were vented to the atmosphere. Strips of Ni-Cr-Mo Hastelloy C alloy were suspended in the liquid phase in the reactor. These strips were 0.125 inch thick, 1.0 inch long and 0.75 inch wide prepared by cutting through the weld, to expose a transverse section through the weld, of a strip 2 inches long and 0.75 inch wide having a weld in the central portion thereof. The strips with the weld metal at one end were exposed to the reaction mixture for a total of 1606 hours which included heating to reaction temperature, reaction and cooling. The amount of corrosion during exposure was determined by metallographic measurements and correlated with weight loss of metal. The determined corrosion was then extrapolated linearly to an inch per year rate (i.p.y.).

Four test strips were subjected to this corrosion test. Strip A was prepared from Ni-Cr-Mo Hastelloy C alloy heat stabilized at 2050° F. for 6 hours according to the process of this invention, welded and not post weld heat treated. Strip B was prepared from Ni-Cr-Mo Hastelloy C alloy heat stabilized for 6 hours at 2050° F. according to the process of this invention, welded and post weld heat treated by heat stabilizing at 2050° F. for 6 hours according to the process of this invention. Strip C was prepared from Ni-Cr-Mo Hastelloy C alloy heat treated according to the process of this invention prior to welding, welded, then heated to 2250° F. for 5 minutes and water quenched (solution annealed). Strip D was prepared from Hastelloy C, solution annealed at 2250° F., welded and post weld treated by solution annealing.

The results of this corrosion study are reported in Table II with respect to the metal removed from the weld, interdendritic penetration into the remaining weld, the corrosion of the areas adjacent to the weld and the corrosion of the base metal. The figures reported as "average" are the averages of the penetration or metal removal in the respective portions of the test strip. The "maximum" figures are, of course, the deepest penetration or greatest metal removal in the respective portions of the test strip.

TABLE II

| Weld | Strip A i.p.y. | Strip B i.p.y. | Strip C i.p.y. | Strip D i.p.y. |
|---|---|---|---|---|
| Metal Removed: | | | | |
| Maximum | 0.044 | 0.038 | 0.026 | 0.009 |
| Average | 0.027 | 0.016 | 0.016 | 0.003 |
| Interdendritic Penetration into Remaining weld: | | | | |
| Maximum | 0.023 | 0.017 | 0.019 | 0.021 |
| Average | 0.013 | 0.010 | 0.014 | 0.011 |
| Heat-Affected Zone: | | | | |
| Maximum | 0.032 | 0.014 | 0.006 | 0.013 |
| Parent Metal: | | | | |
| Maximum | 0.017 | 0.011 | 0.017 | 0.026 |
| Average | 0.007 | 0.007 | 0.010 | 0.010 |

Strips A and B represent the heat-stabilization according to the process of this invention. Strip C represents post weld solution annealed treatment proposed prior to this invention. Strip D represents prior and post weld solution annealed treatment proposed prior to this invention. The above data show that strip B possesses properties substantially equivalent to that obtainable by the previously proposed post weld but not practical solution annealed treatment. Strip A is also representative of the properties resulting after repair welding. It was from the data in Table II (strip A and strip B) that the useful life shown in Table I was calculated.

*Example II*

A tubular reaction vessel 8 inches in diameter and 15 feet long and 0.25 inch thick is fabricated by welding together curved plate sections of a Ni-Cr-Mo alloy which contains 56% Ni, 16% Cr, 16% Mo, 6% Fe, 4.5% W, 1.5% Co and 0.08% carbon and which had been solution annealed prior to welding. The top and bottom of the vessel are flanged to receive top and bottom closure members. Samples of the sheets of the same lot or "heat" of alloy used to fabricate the reaction vessel are subjected to metallographic examination and are found to possess a crystalline structure containing a substantially continuous envelope of intermetallic precipitate in the grain boundary intermediate to those of FIG. 1 and FIG. 2 of the accompanying drawing indicating the lack of proper solution annealing. The fabricated vessel to which sample alloy strips are attached is placed in a heat-treating furnace heated with 10 evenly spaced burners. The temperature in various zones of the furnace is measured by Chromel-Alumel thermocouples and controlled by temperature controllers. The furnace is at 2180° F. when the vessel was put in and the furnace temperature dropped to 1840° F. when closed. In 32 minutes the furnace temperature was 2175° F. and held at this temperature 120 minutes. Then the temperature of the furnace is reduced to 2025° F., taking about 135 minutes, and held at this lower heat stabilizing temperature for 120 minutes. The furnace is opened, the reactor removed and is cooled with compressed air directed at the vessel by nozzles. The entire reactor cools to black heat in 3 minutes and is sufficiently cool to touch in 20 minutes. The sample coupons thermally treated with the reactor are etched and subjected to metallographic examination. The intermetallic precipitate in the grain boundary appears as separated, agglomerated and discrete particles intermediate to those of FIG. 2 and FIG. 4 which is an intermetallic precipitate in the grain boundary having improved but marginal corrosion resistance to acidic oxidative materials.

*Example III*

A reaction vessel as described in Example II is fabricated from sheets of Ni-Cr-Mo Hastelloy C alloy having a continuous envelope of intermetallic precipitate in the grain boundary as illustrated by FIG. 1 of the accompanying drawing. Sample coupons of the sheets used to fabricate the vessel were attached to the vessel as in Example II. The vessel with attached samples is placed in a gas fired furnace whose temperature is about 1300° F. The furnace is closed and the reaction vessel is heated slowly, about three hours, to 2140–2165° F. and held at this temperature range for about 60 minutes. Thereafter the furnace is cooled to 2025±25° F. and maintained at this temperature to heat stabilize the alloy. Thereafter the furnace is opened and the vessel is withdrawn and cooled by forced air to a black heat. The sample coupons heat treated with the reaction vessel are etched and subjected to metallographic examination. The crystalline structure of the alloy so heat treated has the intermetallic precipitate of the uniform distribution of discrete agglomerates illustrated by FIG. 4 of the accompanying drawing. Such a structure possesses remarkably outstanding corrosion resistance to acidic oxidative corrosion attack. Although the intermetallic precipitate particles are larger than those illustrated in FIG. 3 of the accompanying drawing, they are more widely separated than those in FIG. 3. This greater separation by the base metal is highly desirable and is characteristic of the crystalline structure resulting from the slow heat up to the temperature above the heat stabilization range followed by cooling to the heat stabilization range of temperatures at which the alloy is held prior to cooling to a black heat.

The improved, superior results obtainable by the process of this invention are illustrated by the following examples wherein various samples of Ni-Cr-Mo alloy consisting essentially of 54 to 56% Ni, 14.5 to 16.5% Cr, 15 to 17% Mo, 4 to 7% Fe, 3 to 4% W, up to 2.5% Co and a maximum of 0.15% carbon with associated Si are heat treated and exposed to boiling aqueous magnesium chloride (42% $MgCl_2$) for seven days. Annealed strips of the specified alloy composition ¼ inch thick x ¼ inch wide x 4 inches long of the same heat lot were heat treated as specified and stressed by forming into a restricted U shape. The curved portion of the restricted stressed shapes and a portion of each leg thereof were immersed in the boiling magnesium chloride solution. Sample A was heated to 2050° F. in 5 minutes, held at 2050° F. for 6 hours and forced air cooled. Sample B was heated to 2050° F. in 3.5 hours, held at 2050° F. for 6 hours and forced air cooled. Sample C was heated to 2150° F. in 3.5 hours and held there for 1 hour, cooled to 2050° F. and held there for 2 hours. The nature of the intermetallic precipitate was observed by micrographic examination of etched portions. The results are tabulated below:

BOILING $MgCl_2$ SOLUTION—7 DAYS

| Sample | Type and Depth of Attack | Intermetallic Precipitate |
| --- | --- | --- |
| A | Intergranular, 0.010 inch, at tension surface only—compressive and neutral areas unaffected. | Separation, marginal. |
| B | Intergranular, 0.005 inch, at tension side only—compressive and neutral areas unaffected. | Separation, reasonably good. |
| C | No ascertainable attack at tension, compression or neutral areas. | Separation, excellent. |

Flat samples of the same heat lot of the same alloy of the same size as employed above were subjected to different heat treatment. Sample D was heat treated by heating to 2050° F. over 3.5 hours, held at 2050° F. for 6 hours and forced air cooled. Sample E was heated to 2150° F. in 3 hours, held at 2150° F. for 60 minutes, cooled to 2025° F., held at 2025° F. for 2 hours and forced air cooled. Sample F was heated to 2250° F. in 3 hours, held at 2250° F. for 60 minutes, cooled to 2025° F., held at 2025° F. for 2 hours, and forced air cooled. Each of samples D, E and F was suspended in the vapor space in an oxidation reactor wherein oxidation reactions of the type described in Example I were carried out. These samples were subjected to the highly corrosive acidic oxidative conditions prevailing in the vapors from the liquid phase reaction for a total of 180 hours each. After removal of these samples of the Ni-Cr-Mo alloy from the reactor, they were subjected to metallographic inspections. The corrosion attack observed and the condition of the intermetallic precipitate are shown below:

| Sample | Corrosion Attack | Intermetallic Precipitate |
| --- | --- | --- |
| D | Little attack ascertainable | Good separation. |
| E | do | Excellent separation like Fig. 4. |
| F | Intergranular attack to 0.004 inch. | Excellent separation in boundary but no particles in grain. |

The heat treatment difference between samples E and F is the initial temperature to which the samples were slowly heated. Sample E was heated to 2150° F. within the range of the preferred embodiment of this invention. Sample F was heated slowly to a temperature outside the preferred elevated temperature, 2100 to 2200° F.; i.e., to 2250° F. Yet, sample F did not possess the same corrosion resistance of samples D and E, and the precipitate formation differed in kind from that of sample E which is, of course, the preferred structure.

This application is a continuation-in-part of application Serial No. 689,802, filed October 14, 1957, now abandoned.

What is claimed is:

1. A method for imparting improved acidic oxidative corrosion resistance to a solid nickel-base alloy containing about 54 to 56% Ni, 14.5% to 16.5% Cr, 15 to 17% Mo, 4 to 7% Fe and 3 to 4.5% W and no more than 0.15% carbon with up to a maximum of 1% Si; which has been previously subjected to solution annealing and which contains a relatively continuous grain boundary precipitate of an intermetallic compound of the type $(M)_7(M_1)_6$ wherein M is a mixture of nickel, iron, and cobalt and $M_1$ is a mixture of molybdenum and tungsten more subject to corrosion than the base metal, comprising heating said solid alloy to an elevated temperature in the range of 2100 to 2200° F. slowly over a period of 3 to 5 hours from below about 1300° F. to dissolve at least a portion of the compounds in the relatively continuous grain boundary precipitate, cooling said alloy to a temperature in the range of from 2000 to 2100° F. and then maintaining said heated solid alloy at heat stabilization temperature in the range of from 2000 to 2100° F. for at least 2 hours, whereby said heating results in the agglomeration and separation of discrete particles of said grain boundary precipitate, thereafter discontinuing the heating of said heated solid alloy and cooling it to black heat at a rate obtained by forced air cooling.

2. The method for imparting improved acidic oxidative corrosion resistance to a solid nickel-base alloy containing about 54 to 56% Ni, 14.5 to 16.5 Cr. 15 to 17% Mo, 4 to 7% Fe, and 3 to 4.5% W and no more than 0.15% carbon with up to 1% maximum Si; which has been previously subjected to solution annealing and which contains a relatively continuous grain boundry precipitate of an intermetallic compound of the type $(M)_7(M_1)_6$ wherein M is a mixture of nickel, iron, and cobalt and $M_1$ is a mixture of molybdenum and tungsten more subject to corrosion than the base metal, comprising heating said solid alloy to an elevated temperature in the range of from $2150\pm25°$ F. slowly over a period of from 3 to 5 hours from below about 1300° F. to dissolve at least a portion of the compounds in the relatively continuous grain boundry precipitate, maintaining the heated alloy at $2150\pm25°$ F. for 5 to 100 minutes, cooling the heated alloy to a temperature in the range of $2050\pm50°$ F., maintaining the heated alloy at a temperature in the range of $2050\pm50°$ F. for at least two hours and thereafter cooling the heated alloy to black heat by forced air cooling.

3. A method for imparting impoved acidic oxidative corrosion resistance to a solid nickel-base alloy containing about 54 to 56% Ni, 14.5% to 16.5% Cr, 15 to 17% Mo, 4 to 7% Fe and 3 to 4.5% W and no more than 0.15% carbon with up to a maximum of 1% Si; which has been previously subjected to solution annealing and which contains a relatively continuous grain boundary precipitate of an intermetallic compound of the type $(M)_7(M_1)_6$ wherein M is a mixture of nickel, iron, and cobalt and $M_1$ is a mixture of molybdenum and tungsten more subject to corrosion than the base metal, comprising heating said solid alloy to an elevated temperature in the range of 2100 to 2200° F. slowly over a period of 3 to 5 hours from below about 1300° F. to dissolve at least a portion of the compounds in the relatively continuous grain boundary precipitate, cooling said alloy to a temperature in the range of from 2000 to 2100° F., and then maintaining said heated solid alloy at heat stabilization temperature in the range of from 2000 to 2100° F. for at least 2 hours, whereby said heating results in the agglomeration and separation of discrete particles of said grain boundary precipitate, thereafter discontinuing the heating of said heated solid alloy and cooling it to black heat at a rate of at least equal to that obtained by forced air cooling.

References Cited in the file of this patent

UNITED STATES PATENTS 2,237,872     Badger _____ Apr. 8, 1941

OTHER REFERENCES

Materials and Methods Manual #21, Nickel and High-Nickel Alloys, pages 1476–1490, Materials and Methods, December 1946, reprinted by International Nickel Co. Inc.

Metals Handbook, 1948 edition, pages 1056–1057.

UNITED STATES PATENT OFFICE
CERTIFICATE OF CORRECTION

Patent No. 3,028,268            April 3, 1962

George F. Tisinai et al.

It is hereby certified that error appears in the above numbered patent requiring correction and that the said Letters Patent should read as corrected below.

Column 3, line 74, for "substantially" read -- substantial --; column 4, line 56, for "first" read -- heat --; column 12, line 75, for "tempelature" read -- temperature --; column 13, line 15, for "16.5 Cr." read -- 16.5% Cr, --.

Signed and sealed this 24th day of July 1962.

(SEAL)
Attest:

ERNEST W. SWIDER
Attesting Officer

DAVID L. LADD
Commissioner of Patents